United States Patent [19]
Yamada et al.

[11] Patent Number: 5,699,334
[45] Date of Patent: Dec. 16, 1997

[54] CONTROL DEVICES FOR OPTICAL DISK BASED ON DRIVING SIGNAL SATURATION

[75] Inventors: Shin-ichi Yamada, Katano; Takeharu Yamamoto, Takatsuki; Yasuaki Edahiro, Habikino; Mitsurou Moriya, Ikoma, all of Japan

[73] Assignee: Matsushita Electric Industrial Co., Ltd., Kadoma, Japan

[21] Appl. No.: 589,861

[22] Filed: Jan. 22, 1996

[30] Foreign Application Priority Data

Jan. 24, 1995 [JP] Japan ................... 7-009089

[51] Int. Cl.$^6$ ............................ G11B 7/095
[52] U.S. Cl. ................ 369/44.32; 369/44.34; 369/44.35
[58] Field of Search .............. 369/44.32, 44.34, 369/44.28, 44.29, 44.35, 44.26, 124, 106; 250/201.5

[56] References Cited

U.S. PATENT DOCUMENTS

| | | | |
|---|---|---|---|
| 4,748,609 | 5/1988 | Yonezawa et al. | 369/44.34 |
| 4,872,152 | 10/1989 | Tsuyoshi et al. | 369/124 |
| 5,083,150 | 1/1992 | Nagasaki et al. | 354/402 |
| 5,084,848 | 1/1992 | Deguchi et al. | 369/44.25 |
| 5,138,596 | 8/1992 | Yamada | 369/44.29 |
| 5,247,502 | 9/1993 | Sato | 369/44.34 |
| 5,461,599 | 10/1995 | Iida | 369/44.34 |
| 5,487,055 | 1/1996 | Suzuki | 369/44.29 |

FOREIGN PATENT DOCUMENTS

| | | |
|---|---|---|
| 5182233 | 7/1993 | Japan . |
| 668494 | 3/1994 | Japan . |

*Primary Examiner*—Thang V. Tran
*Attorney, Agent, or Firm*—Renner, Otto, Boisselle & Sklar, P.L.L.

[57] ABSTRACT

A tracking control device for controlling a position of a beam spot formed by converging a light beam on a disk having tracks formed thereon includes: an actuator for moving the beam spot in a direction substantially perpendicular to the tracks; a tracking error detecting circuit for detecting a deviation of the beam spot from one of the tracks using the light beam returning from the disk and for outputting a tracking error signal indicative of the detected deviation; and a control circuit section for outputting a driving signal to drive the actuator in accordance with the tracking error signal so as to control the beam spot to be positioned on the one of the tracks. When the driving signal is saturated, the control circuit section obtains a saturation signal in accordance with an amount of the saturation, delays the saturation signal, and supplies the saturation signal to the actuator together with the driving signal.

14 Claims, 14 Drawing Sheets

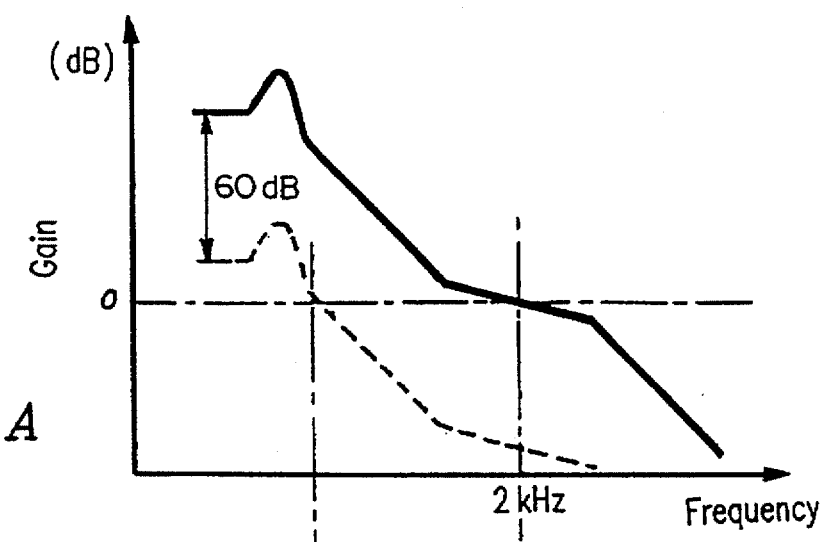
FIG.21A
PRIOR ART
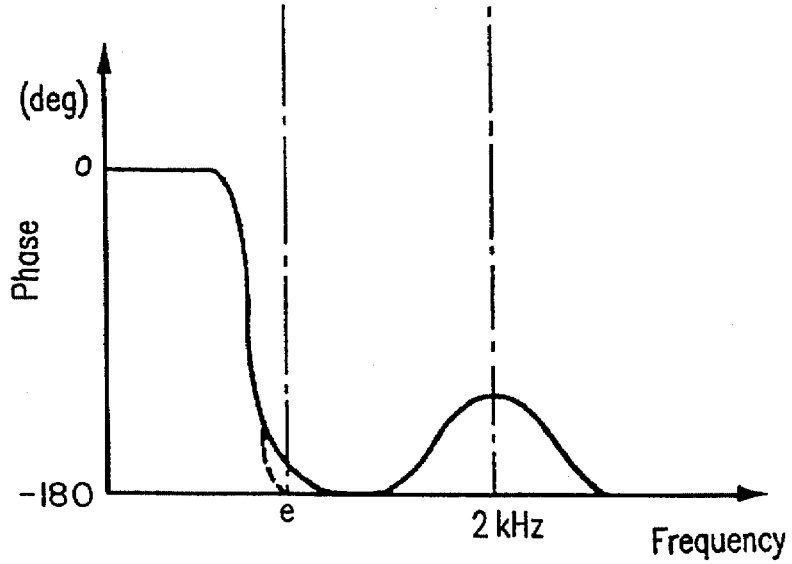
FIG.21B
PRIOR ART
FIG.22A
PRIOR ART
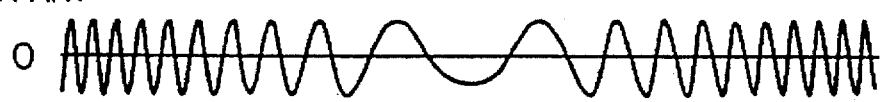
FIG.22B PRIOR ART
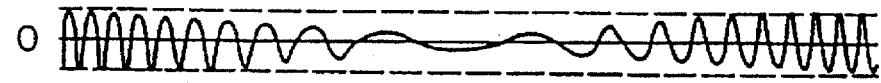

CONTROL DEVICES FOR OPTICAL DISK BASED ON DRIVING SIGNAL SATURATION

BACKGROUND OF THE INVENTION

1. Field of the Invention

The present invention relates to a focusing control device and a tracking control device for an optical disk apparatus for recording/reproducing information onto/from a disk having a plurality of tracks by radiating a converged light beam onto the disk.

2. Description of the Related Art

Conventionally, there is an optical disk apparatus for recording/reproducing information onto/from a disk by using a light beam. In the optical disk apparatus, the light beam is emitted from a semiconductor laser diode and is then converged by an objective lens so as to form a beam spot on the disk rotating at a predetermined rotational speed.

FIG. 13 is an enlarged view of a disk. A plurality of minute tracks (shown as convex portions in FIG. 13) each having a width of 0.6 μm and a pitch of 1.6 μm, are provided on the disk in a spiral manner or a concentric manner. In the case where information recorded onto the tracks is reproduced, tracking control is performed so that the beam spot is positioned on the track (convex portion in FIG. 13) while performing focusing control so that a point at which the light beam is focused is always positioned on an information face of the disk.

The amount of shift between the point at which the converged light beam is focused and the information face is detected as a focusing error signal using a detection method, for example, an astigmatism method. FIG. 14 is a block diagram showing a focusing control device. The focusing error signal detected is supplied to a focusing actuator 502 via a phase compensation circuit 500 and a power amplifier 501. The phase compensation circuit 500 serves to stabilize the focusing control device. The focusing actuator 502 moves the objective lens in a direction perpendicular to the information face of the disk. Therefore, an output of the focusing actuator 502 indicates the position of the point at which the light beam is focused.

FIGS. 15A and 15B show an example of frequency characteristics of the phase compensation circuit 500: FIG. 15A shows gain characteristics; and FIG. 15B shows phase characteristics. As shown in FIGS. 15A and 15B, the characteristics of the phase compensation circuit 500 make the phase ahead at about 2 KHz. Therefore, in the phase compensation circuit 500, a gain begins to increase at several hundreds of Hz. Gain characteristics of the whole focusing control device as shown in FIG. 14 is represented in FIG. 16 with a solid line.

On the information face of the optical disk, a large number of tracks are formed. Therefore, when reproduction of information recorded on a track which is located far from the track on which the beam spot is formed is tried, an operation for moving the beam spot to the target track, generally referred to as a search operation, is performed. In general, when the beam spot crosses the tracks, the focusing error signal is disturbed. Thus, the focusing error signal when the beam spot crosses the tracks has such a waveform that a disturbance caused by travel of the beam spot across the tracks is superimposed on a control error caused by the sway of the disk.

The speed at which the light beam spot crosses the tracks is several mm/s. Therefore, a frequency of the disturbance when the beam spot moves across the tracks is several kHz or more. As a result, the disturbance superimposed on the focusing error signal is amplified in the phase compensation circuit 500 having the frequency characteristics shown in FIG. 14. This amplification sometimes causes an output voltage of the power amplifier 501 to be saturated.

Hereinafter, the saturation of the output voltage of the power amplifier 501 will be described with reference to FIGS. 16 and 17.

FIG. 17 shows an example of the output voltage of the power amplifier 501 during the search operation. During a time period a, the output voltage is positive due to the sway of the disk and the like. Thus, with this positive voltage, the objective lens is moved so that the beam spot formed on the information face of the disk is in focus. During a time period b, the sway of the disk changes from the sway during time period a, resulting in making the output voltage negative. Similarly to the time period a, with this negative voltage, the objective lens is moved so that a point at which the light beam is focused is positioned on the information face of the disk.

However, due to the existence of the disturbance generated when the beam spot travels across a plurality of tracks, a value of the output voltage of the power amplifier 501 is sometimes different from a value to be obtained where no disturbance is superimposed on the focusing error signal. In the power amplifier 501, the output voltage is saturated when a value of the positive voltage is larger than a value indicated with an upper broken line or when a value of the negative voltage is smaller than a value indicated with a lower broken line in FIG. 17. For example, during the time period a, the positive output voltage is lowered by saturation due to the disturbance, and therefore a gain of the focusing control device is decreased. The gain characteristics of the focusing control device in the case where the output voltage of the power amplifier 501 is saturated are represented with a broken line in FIG. 16.

Next, a tracking control for precisely positioning the beam spot on the track from which information is reproduced or on which information is recorded will be described. The amount of deviation of the beam spot from the track is detected as a tracking error signal by, for example, a push pull method. The tracking control is performed, based on the tracking error signal, by moving the objective lens in a direction perpendicular to the tracks, i.e., a radial direction of the disk.

FIG. 18 shows a block diagram of the tracking control device. The tracking error signal (signal c) is supplied to a tracking actuator 512 via a phase compensation circuit 510 and a power amplifier 511. The tracking actuator 512 drives the objective lens in a direction perpendicular to the track. The frequency characteristics of the phase compensation circuit 510 are the same as those of the focusing control device.

The tracking control device shown in FIG. 18 differs from the focusing control device shown in FIG. 14 in that the tracking control device has a path B. The path B will be described in detail.

According to the push pull method, the tracking error signal is obtained as follows. The reflected light from the disk which is diffracted by the track is received by a two-divided photodetector having two light receiving portions arranged symmetrically with a center line of the track. Then, a difference of outputs of the two light receiving portions is detected. This difference of the outputs of the photodetector is used as the tracking error signal. In the case where the center of the beam spot and the center of the track are identical with each other, the outputs of the two light receiving portions are equal to each other. In the other cases, the intensity of the diffracted light reaching one light receiving portion is different from that reaching the other light receiving portion.

FIG. 19 shows an example of the waveform of the tracking error signal obtained by the push pull method. When the beam spot is positioned on the center of the track, the tracking error signal is zero. When the beam spot deviates from the center of the track, the tracking error signal has a negative or positive value. In some cases, the inclination of the tracking error signal obtained when the beam spot is located on a convex portion (the center of the track) may be different from that obtained when the beam spot is located on a concave portion because of the difference of shape between the convex portion and the concave portion.

In the push pull method, when the objective lens is displaced from the center, an offset occurs in accordance with the direction and the amount of displacement. The above-mentioned path B corresponds to a path representing this offset. As shown in FIG. 18, an output of the tracking actuator 512 indicative of the position of the objective lens is multiplied by a constant Kp and is then subtracted from a signal a. The constant Kp represents the relationship between displacement of the objective lens and the offset. The tracking error signal (signal c) is obtained by subtracting the offset (signal b) caused by the displacement of the objective lens from the amount of deviation (signal a) of the beam spot from the center of the track. FIG. 20 shows an example of the tracking error signal (signal c), taking the offset due to displacement of the objective lens into consideration. In FIG. 20, an abscissa represents the amount of displacement of the objective lens, and an ordinate represents the level of the tracking error signal. A point f indicates where the displacement of the objective lens is zero and the beam spot is positioned on the center of the convex portion (center of the track). On the other hand, the tracking error signal having the waveform shown in FIG. 19 is obtained when the signal b is zero. The waveform of FIG. 19 is obtained in the case where the position of the track is shifted due to decentering of the disk and the like while the displacement of the objective lens is zero, that is, the objective lens is on the central position.

In some cases, the beam spot moves across the tracks due to impulse externally applied to the optical disk apparatus while being under the tracking control. Hereinafter, an operation of the tracking control device under such a state will be described. The tracking error signal under such a state has a waveform similar to the aforementioned waveform shown in FIG. 20. The tracking error signal (signal c) shown in FIG. 20 is obtained by subtracting the signal b from the signal a as mentioned above. The signal a has a waveform similar to that shown in FIG. 19. In other words, the signal a does not have an offset even when the objective lens is displaced from the central position. Therefore, an average value of the signal a becomes zero. Accordingly, in the case where the beam spot travels across a plurality of tracks at high speed and therefore a frequency of the signal a is higher than the waveband of the tracking control device, the objective lens does not move in response to the signal a. This state corresponds to the state in which a path A for feedback is not provided in the tracking control device as shown in FIG. 18. Thus, feedback control for the tracking error signal is performed only through a path B. However, this is limited to the case where no saturation occurs in the tracking control device. The operation of the tracking control device in the case where saturation occurs will be described later.

Thus, when the beam spot travels across the tracks while being under the tracking control, only the path B functions in the tracking control device shown in FIG. 18. This means that only the offset caused by the displacement of the objective lens from the central position thereof is fed back through the path B. Therefore, the objective lens is controlled to move so that displacement from the central position thereof is zero. However, in this case, a gain of the tracking control device is reduced by about 60 dB as compared with the case where normal feedback path A functions, since the constant Kp in FIG. 18 is generally about $10^{-3}$ as shown in FIGS. 21A and 21B. In FIGS. 21A and 21B, solid lines show the normal case, and dot lines show the case where the beam spot travels across the tracks while being under the tracking control. When the normal tracking control in which the path A functions is performed, the influence of the feedback through the path B is remarkably small since the constant Kp is extremely small as described above.

FIGS. 22A, 22B and 22C show examples of the tracking error signal (signal c), an output voltage of the power amplifier 511 and the signal b, respectively. In the case where the beam spot travel across the tracks under the tracking control, the objective lens first moves in a direction perpendicular to the tracks toward a target track, and then moves in an opposite direction. This is because the objective lens is fixed by springs or the like so that it is positioned on the central position. When the objective lens moves, for example, in a direction from an inner periphery to an outer periphery of the disk, the springs or the like moves the objective lens in an opposite direction, i.e., a direction from the outer periphery to the inner periphery of the disk. Therefore, the movement of the light beam spot follows the objective lens. FIGS. 22A through 22C show waveforms about the time when the direction of movement changes. FIGS. 22A through 22C show an example of the tracking error signal (signal c), an example of the output voltage of the power amplifier 511, and an example of the signal b in FIG. 18, respectively. The waveform shown in FIG. 22B shows the case where saturation occurs at the levels indicated with broken lines. A time period c is a time period during which the beam spot moves toward the inner periphery of the disk, and a time period d is a time period during which the beam spot moves toward the outer periphery of the disk.

As shown in FIG. 22A, the inclination of the tracking error signal when the beam spot is located on the convex portion (center of the track) differs from that when the beam spot is located on the concave portion, which is the same as described with reference to FIG. 19. Therefore, the beam spot travels across the tracks at a certain speed, a frequency of the tracking error signal when the beam spot is located on the convex portion is different from that when the beam spot is on the concave portion. This difference in frequency of the tracking error is converted to a difference in amplitude of an output of the phase compensation circuit 510, since the circuit 510 has frequency characteristics in which an input signal is differentiated and the phase is made to be ahead by around of 2 kHz. In addition, the difference in amplitude of the output of the phase compensation circuit 510 varies depending on the direction of movement of the beam spot. This is because a polarity of the tracking error signal to be input to the phase compensation circuit 510 is inverted in accordance with the direction in which the beam spot travels.

The operation of the tracking control device in the case where saturation occurs will be described. It is assumed that an output voltage of the power amplifier 511 is saturated at the levels indicated with the dotted lines shown in FIG. 22B and that the objective lens moves in a direction from the inner periphery to the outer periphery of the disk when the output voltage of the power amplifier 511 is negative.

The signal b shown in FIG. 18, whose polarity is inverted when the signal b is added to the signal a, is input to the phase compensation circuit 510. As shown in FIG. 22C, since the signal b during the time period c has a positive value, the objective lens is moved by the signal b in the direction from the inner periphery to the outer periphery of the disk. However, as shown in FIG. 22B, the output voltage of the power amplifier 511 is saturated at a negative voltage during the time period c. This is because the inclination of the tracking error signal when the beam spot is located on the convex portion (center of the track) differs from that when the beam spot is located on the concave portion. This saturation reduces the amount of movement of the objective lens in the direction toward the outer periphery of the disk.

Also, during the time period d, since the signal b has a positive value as shown in FIG. 22C, the objective lens is moved in the direction from the inner periphery toward the outer periphery of the disk by the signal b. However, the output voltage of the power amplifier 511 is saturated at a positive voltage because the direction of movement of the beam spot is inverted. This saturation increases the amount of movement of the objective lens in the direction toward the outer periphery of the disk.

The waveform shown in FIG. 22C, which is the waveform of the signal b caused by the displacement of the objective lens, has its maximum point at the time when the direction of movement of the beam spot changes because the amount of displacement of the objective lens becomes maximum at that time. Therefore, the output voltage of the power amplifier 511, whose waveform depends on the waveform of the signal b also becomes maximum at that time. Before and after the time when the direction of movement of the beam spot changes, the above-mentioned saturation occurs. Thus, the level of the power amplifier 511 becomes lower immediately before the direction of movement of the beam spot changes (the time period c) and becomes higher immediately after the direction of movement of the beam spot changes (the time period d) as compared with the case where no saturation occurs. The phase of the output voltage of the power amplifier 511 is behind.

The frequency characteristics of the tracking control device in the case where saturation occurs in the power amplifier 511 are shown in FIGS. 21A and 21B by broken lines. As shown in FIG. 21A, a gain is lowered. As indicated with the broken line in FIG. 21B, the phase is behind at a frequency e at which the objective lens is displaced. At the frequency e, the objective lens slowly oscillates. At the frequency e, a gain is 0 dB and a phase is 180 degrees behind, which satisfy the oscillation conditions. Therefore, the objective lens continuously oscillates.

Although the case where information is recorded onto the convex portions as shown in FIG. 13 is described in the above description, there is an optical disk on which information is recorded onto the concave portions. In such an optical disk, it is necessary to perform the tracking control so that the beam spot is positioned on a target concave portion. In the waveform of the tracking error signal, as is apparent from FIG. 19, the inclination when the beam spot is located on the convex portions is inverted from that when the beam spot is located on the concave portions. Therefore, by inverting the detected tracking error signal, it is possible to control the beam spot to be positioned on the concave portion in the same manner as the case where the beam spot is controlled to be positioned on the convex portion.

FIG. 23 shows a block diagram of a tracking control device for controlling the beam spot to be positioned on the concave portion. The tracking error signal is inverted by an inversion amplifier 513, and then is input to the phase compensation circuit 510. In the tracking control system as shown in FIG. 23, the signal from the tracking actuator 512 is fed back through the path B with polarity thereof unchanged, whereas the signal from the tracking actuator 512 is subjected to negative feedback in the case of using the convex portions as the tracks on which information is recorded. Thus, in the case of controlling the beam spot to be located on the concave portion, the oscillation conditions are not satisfied by the above-mentioned saturation.

SUMMARY OF THE INVENTION

The tracking control device of this invention for controlling a position of a beam spot formed by converging a light beam on a disk having tracks formed thereon, the tracks including at least convex tracks, includes: moving means for moving the beam spot in a direction substantially perpendicular to the track; tracking error detecting means for detecting a deviation of the beam spot from one of the tracks using the light beam returning from the disk and for outputting a tracking error signal indicative of the detected deviation; and control means for outputting a driving signal to drive the moving means in accordance with the tracking error signal so as to control the beam spot to be positioned on the one of the tracks. The control means, when the driving signal is saturated, obtains a saturation signal in accordance with an amount of the saturation, delays the saturation signal and supplies the saturation signal to the moving means together with the driving signal.

In one embodiment of the invention, the tracks further include concave tracks, and the control means supplies the saturation signal to the moving means when the beam spot is controlled to be positioned on one of the convex tracks, whereas the control means supplies the driving signal without supplying the saturation signal when the beam spot is controlled to be positioned on one of the concave tracks.

In another embodiment of the invention, the control means includes: analog-to-digital converting means for digitalizing the tracking error signal; and digital signal processing means for processing the digitalized tracking error signal and for outputting the driving signal in accordance with the result of the processing. The digital signal processing means obtains the saturation signal and supplies the delayed saturation signal to the moving means together with the driving signal.

In still another embodiment of the invention, the digital signal processing means receives a reference clock and delays the saturation signal by a time period having a length obtained by multiplying a period of the reference clock by an integer equal to or greater than 1.

According to another aspect of the invention, a tracking control device for controlling a position of a beam spot formed by converging a light beam on a disk having tracks formed thereon, the tracks including at least convex tracks, includes: moving means for moving the beam spot in a direction substantially perpendicular to the tracks; tracking error detecting means for detecting a deviation of the beam spot from one of the tracks using the light beam returning from the disk, and for outputting a tracking error signal indicative of the detected deviation; and control means for outputting a driving signal to drive the moving means in accordance with the tracking error signal so as to control the beam spot to be positioned on the one of the tracks. In the tracking device, the control means, when the driving signal is saturated, integrates the amount of the saturation, and supplies the integrated amount of the saturation to the moving means when a polarity of the driving signal is inverted, so as to reduce the driving signal by the integrated amount of the saturation.

In one embodiment of the invention, the tracks further include concave tracks, and the control means reduces the driving signal by supplying the integrated amount of the saturation when the beam spot is controlled to be positioned to one of the convex tracks, whereas the control means supplies the driving signal without reducing the driving signal when the beam spot is controlled to be positioned to one of the concave tracks.

In another embodiment of the invention, the control means includes: analog-to-digital converting means for digitalizing the tracking error signal; and digital signal processing means for processing the digitalized tracking error signal and for outputting the driving signal in accordance with the result of the processing. The digital signal processing means integrates the amount of the saturation when the driving signal is saturated, and supplies the integrated amount of the saturation to the moving means so as to reduce the driving signal by the integrated amount of the saturation.

According to still another aspect of the invention, a focusing control device for controlling a point at which a light beam is focused to be positioned on a disk, includes: moving means for moving the point in a direction substantially perpendicular to the disk; focusing error detecting means for detecting a shift of the point from the disk using the light beam returning from the disk and for outputting a focusing error signal indicative of the detected shift; and control means for outputting a driving signal to drive the moving means in accordance with the focusing error signal so as to control the point to be positioned on the disk. In the focusing control device, the control means, when the driving signal is saturated, obtains a saturation signal indicative of an amount of the saturation, delays the saturation signal and supplies the saturation signal to the moving means together with the driving signal.

In one embodiment of the invention, control means includes: analog-to-digital converting means for digitalizing the focusing error signal; and the digital signal processing means for processing the digitalized focusing error signal and for outputting the driving signal in accordance with the result of processing. The digital signal processing means obtains the saturation signal and supplied the delayed saturation signal to the moving means together with the driving signal.

In another embodiment of the invention, the digital signal processing means receives a reference clock and delays the saturation signal by a time period having a length obtained by multiplying a period of the reference clock by an integer equal to or greater than 1.

According to still another aspect of the invention, a focusing control device for controlling a point at which a light beam is focused to be positioned on a disk, includes: moving means for moving the point in a direction substantially perpendicular to the disk; focusing error detecting means for detecting a shift of the point from the disk using the light beam returning from the disk, and for outputting a focusing error signal indicative of the detected shift; and control means for outputting a driving signal to drive the moving means so as to control the point to be positioned on the disk. In the focusing driving device, the control means integrates the amount of the saturation, and supplies the integrated amount of the saturation to the moving means when a polarity of the driving signal is inverted, so as to reduce the driving signal by the integrated amount of the saturation.

In one embodiment of the invention, the control means includes: analog-to-digital converting means for digitalizing the focusing error signal; and the digital signal processing means for processing the digitalized focusing error signal and for outputting the driving signal in accordance with the result of processing. The digital signal processing means integrates the amount of the saturation when the driving signal is saturated, and supplies the integrated amount of the saturation to the moving means so as to reduce the driving signal by the integrated amount of the saturation.

According to still another aspect of the invention, an optical disk apparatus for recording information on an optical disk having tracks and/or for reproducing information from the optical disk, includes: moving means for moving the beam spot in a direction substantially perpendicular to the tracks; tracking error detecting means for detecting a deviation of the beam spot from one of the tracks using the light beam returning from the disk and for outputting a tracking error signal indicative of the detected deviation; and control means for outputting a driving signal to drive the moving means in accordance with the tracking error signal so as to control the beam spot to be positioned on the one of the tracks. In the optical disk apparatus, the control means, when the driving signal is saturated, obtains a saturation signal in accordance with an amount of the saturation, delays the saturation signal and supplies the saturation signal to the moving means together with the driving signal.

In one embodiment of the invention, the optical disk apparatus further includes focusing error detecting means for detecting a shift of a point at which the light beam is focused from the disk using the light beam returning from the disk and for outputting a focusing error signal indicative of the detected shift. In the optical disk apparatus, the moving means also moves the point in a focusing direction substantially perpendicular to the disk, and the control means outputs a further driving signal for driving the moving means to move the point at which the light beam is focused in the focusing direction in accordance with the focusing error signal. When the further driving signal is saturated, the control means obtains a further saturation signal indicative of an amount of the saturation of the further driving signal, delays the further saturation signal and supplies the further saturation signal to the moving means together with the further driving signal.

Thus, the invention described herein makes possible the advantages of providing a focusing control device and a tracking control device which are not rendered stable even when saturation occurs therein, and providing an optical disk apparatus including at least one of such control devices.

These and other advantages of the present invention will become apparent to those skilled in the art upon reading and understanding the following detailed description with reference to the accompanying figures.

BRIEF DESCRIPTION OF THE DRAWINGS

FIGS. 21A and 21B are graphs showing frequency characteristics of the conventional tracking control device.

FIGS. 22A, 22B and 22C are waveforms of signals obtained in the respective parts of the conventional tracking control device.

DESCRIPTION OF THE PREFERRED EMBODIMENTS

Hereinafter, the present invention will be described by way of illustrative example.

EXAMPLE 1

A tracking control device and a focusing control device according to Example 1 of the present invention will be described with reference to FIG. 1.

Figure 1:
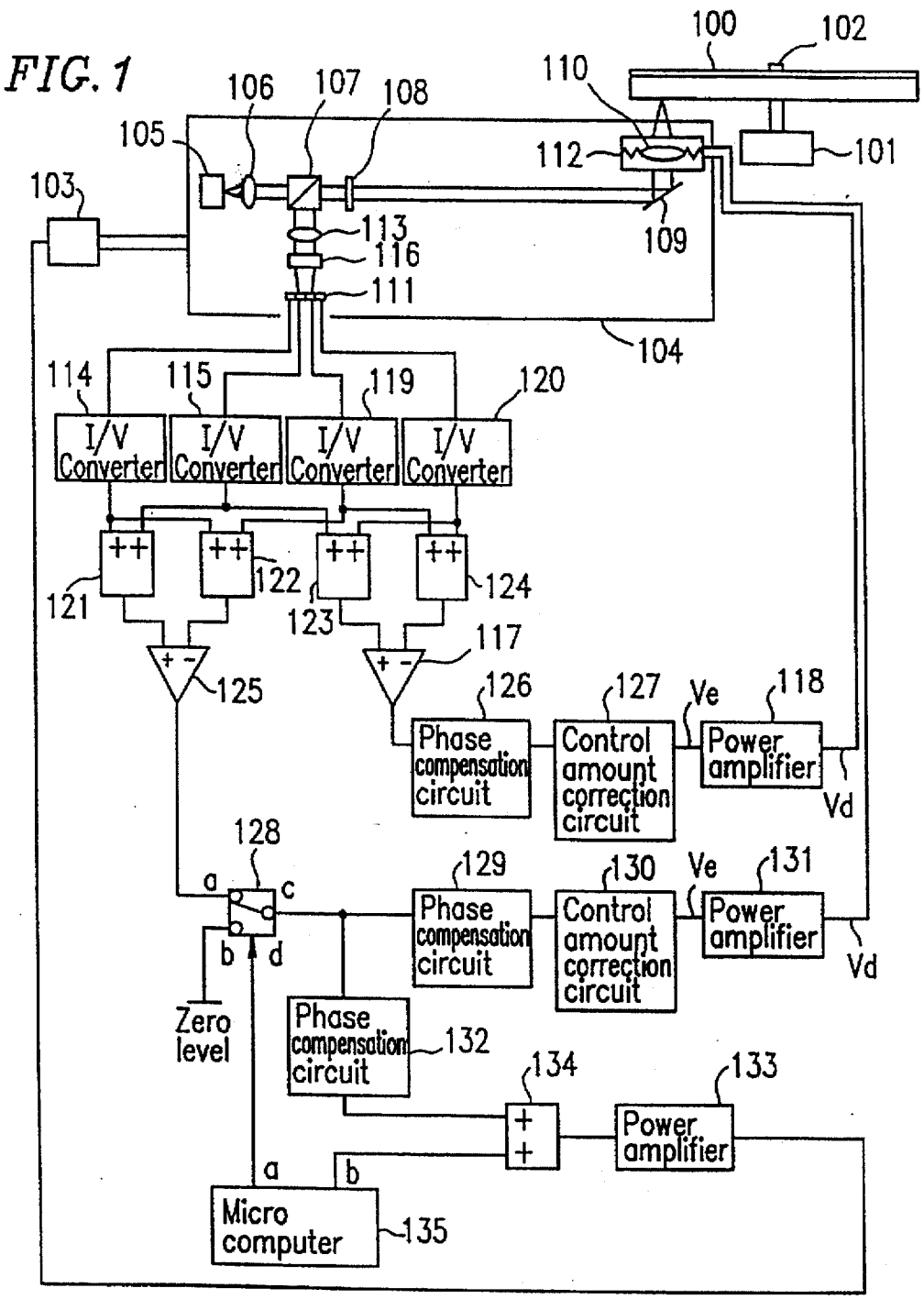
FIG. 1 is a block diagram showing a focusing control device and a tracking control device according to a first example of the present invention.

FIG. 1 is a block diagram of an optical disk apparatus including the focusing control device and the tracking control device of Example 1. A disk 100 is attached to a rotary shaft 102 of a motor 101, and rotates at a predetermined rotational speed. A transfer table 104 is provided with, for example, a light source 105 such as a semiconductor laser diode, a coupling lens 106, a polarized beam splitter 107, a quarter wave plate 108, a total reflection mirror 109, a photodetector 111 and a fixed part (not shown) of an actuator 112. The transfer table 104 is configured so as to move in a radial direction of the disk 100 by a transfer motor 103 such as a linear motor.

A light beam emitted from the light source 105 such as a semiconductor laser diode placed within the transfer table 104 is collimated by means of the coupling lens 106. After passing through the polarized beam splitter 107 and the quarter wave plate 108, the collimated light beam is reflected by the total reflection mirror 109. Then, the reflected light beam is converged onto an information face of the disk 100 by an objective lens 110. The light reflected by the information face passes through the objective lens 110, and then is reflected by the total reflection mirror 109. The reflected light beam passes through the quarter wave plate 108, the polarized beam splitter 107, a detection lens 113 and a cylindrical lens 116 so as to be incident on a photodetector 111.

The objective lens 110 is attached to a movable part of the actuator 112. The actuator 112 consists of coils for a focusing operation and coils for a tracking operation, both of which are provided for the movable part of the actuator 112, and a permanent magnet for the focusing operation and a permanent magnet for the tracking operation which are provided for the fixed part of the actuator 112. Herein, the focusing operation is an operation of moving the objective lens 110 in a direction perpendicular to the information face of the disk 100, and the tracking operation is an operation of moving the objective lens 110 in the radial direction of the disk 100.

In the focusing operation, a voltage is applied to the focusing coils (not shown) of the actuator 112 using a driving circuit (not shown), so that currents flow through the focusing coils so as to generate magnetic force in the direction perpendicular to the information face of the disk 100, causing the objective lens 110 to move in the direction perpendicular to the information face of the disk 100. The voltage to be applied is determined based on the focus error signal. In this way, by applying the voltage based on the focus error signal to the actuator 112, the objective lens 110 is controlled so that the light beams incident on the disk 100 are always converged in a predetermined state, that is, focusing control is performed.

In the tracking operation, when a voltage is applied to the tracking coils using a driving circuit, currents flow through the coils, whereby the coils receive magnetic force from the permanent magnet for tracking. Thus, the objective lens 110 moves in the radial direction of the disk 100, that is, so as to travel across the track on the disk 100 (in a horizontal direction in FIG. 1).

The reflected light from the disk 100 is incident on the photodetector 111 having four light receiving portions. Each light receiving portion generates a current in accordance with the amount of the light incident thereon. Then, the currents from the photodetector 111 are input to I/V converters 114, 115, 119 and 120, respectively. The I/V converters 114, 115, 119 and 120 convert the currents into voltages in accordance with their current levels. Adders 121, 122, 123 and 124 add input signals. The resultant values are transmitted to differential amplifier 117 and 125, respectively. The differential amplifier 117 calculates a difference in input voltages, and outputs a calculated value. In the optical disk apparatus shown in FIG. 1, the focusing error signal is obtained by a method which is generally referred to as an astigmatism method. Therefore, an output of the differential amplifier 117 serves as the focusing error signal representing a shift of a point at which the light beam is focused from the information face of the disk 100.

The focusing error signal is transmitted to the power amplifier 118 via a phase compensation circuit 126 and a control amount correction circuit 127. The power amplifier 118 applies the voltage to the focusing coils of the actuator 112. The power amplifier 118 is constituted so that a voltage Kd*Va is output as an output voltage Vd when an input voltage is Va, where the range of the output voltage is from −Vcc to +Vcc. Accordingly, when Va is Vcc/Kd or more, the output voltage Vd is saturated and is equal to Vcc. On the other hand, when Va is −Vcc/Kd or less, the output voltage Vd is saturated and is equal to −Vcc.

The phase compensation circuit 126 stabilizes the focus control device. The control amount correction circuit 127 transmits the output signal of the phase compensation circuit 126 to the power amplifier 118. However, when a value of the output signal of the phase compensation circuit 126 is Vcc/Kd or more or −Vcc/Kd or less, that is, when the output voltage of the power amplifier 118 is saturated, a signal processing for reducing the influence of saturation is conducted. The detailed operation will be described below. In this way, since the objective lens 110 is driven in accordance with the focusing error signal, the light beam is always focused on the information face of the disk 100.

The differential amplifier 125 also calculates a difference in input voltages, and outputs the calculated value. The optical system shown in FIG. 1 constitutes a tracking error detection method generally referred to as a push pull method. Therefore, an output of the differential amplifier 125 serves as a tracking error signal representing a deviation of the beam spot and the track.

The tracking error signal is transmitted to a power amplifier 131 via a switch 128 having terminals a, b and c, a phase compensation circuit 129 and a control amount correction circuit 130. The switch 128 is controlled by an output of a micro computer 135 so that either the terminal a or the terminal b is connected to the terminal c. The power amplifier 131 applies a voltage to the tracking coils of the actuator 112. The power amplifier 131 has the same configuration as that of the power amplifier 118 described above.

The phase compensation circuit 129 stabilizes the tracking control device. The control amount correction circuit 130 transmits an output signal of the phase compensation circuit 129 to the power amplifier 131. The phase compensation circuit 129 has the same configuration as that of the aforementioned phase compensation circuit 126. When the terminals a and c of the switch 128 are connected to each other by the micro computer 135, the actuator 112 is driven to move the objective lens 110 in accordance with the tracking error signal, so that the beam spot tracks the target track. In general, a bandwidth of the tracking control device ranges from DC to several kHz.

Also, the tracking error signal is supplied to a power amplifier 133 via the switch 128, a phase compensation circuit 132 and an adder 134, when the terminals a and c of the switch 128 are connected to each other. Then, a voltage is applied to the transfer motor 103 by means of the power amplifier 133. While the terminals a and c of the switch 128 are connected to each other, an output b of the micro computer 135 is zero. Therefore, the transfer motor 103 is driven in response to the tracking error signal. Specifically, the transfer table 104 is controlled in response to the tracking error signal. However, the bandwidth of a control device of the transfer table 104 generally ranges from DC to several Hz. In this way, the transfer table 104 is controlled so that the central position of the objective lens 110 is approximately positioned in the vicinity of a predetermined track. The power amplifier 133 has the same configuration as that of the power amplifier 118 described above.

A search operation is controlled by the micro computer 135. In the case where the search operation is conducted, the micro computer 135 connects the terminals b and c of the switch 128 to each other, thereby stopping tracking control. Then, the micro computer 135 outputs the output b which is not equal to zero to the adder 134 so as to drive the transfer motor 103, thereby moving the transfer table 104 toward a target track. When the transfer table 104 reaches the target track, the output b to the adder 134 is rendered zero. Then, the micro computer 135 connects the terminals a and c of the switch 128 to each other. Therefore, tracking control starts with respect to the target track.

Next, the configuration and operation of the control amount correction circuits 127 and 130 will be described in detail.

Figure 2:
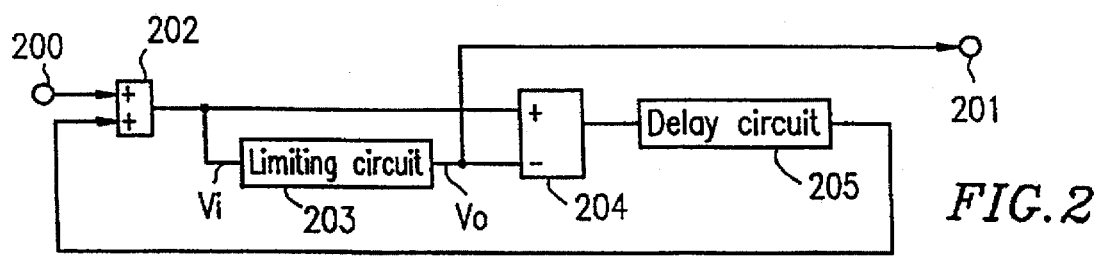
FIG. 2 is a block diagram showing a control amount correction circuit according to the first example of the present invention.

FIG. 2 is a block diagram showing either of the control amount correction circuit 127 or 130 (the control amount correction circuits 127 and 130 have the same configuration). A terminal 200 is an input terminal, which is connected to the phase compensation circuit 126 or 129. A terminal 201 is an output terminal, which is connected to the power amplifier 118 or 131. A signal input to the terminal 200 is transmitted to a limiting circuit 203 and a positive terminal of a subtracter 204 via an adder 202. The limiting circuit 203 outputs Vo, that is, Vo=Vi. In the case where a voltage Vi input thereto is within the range of −Vcc/Kd to Vcc/Kd. In the case where the input voltage Vi is greater than Vcc/Kd, Vo=Vcc/Kd. In the case where the input voltage Vi is smaller than −Vcc/Kd, Vo=−Vcc/Kd. The subtracter 204 outputs a difference in input voltages. A delay circuit 205 delays an input signal and then outputs the delayed signal.

This mechanism will be described using waveforms (a) and (b) of FIG. 3. It is assumed that a signal input to the terminal 200 has a waveform (a) of FIG. 3. If the signal having the waveform (a) is transmitted to the power amplifier 118 or 131 through the terminal 201 with the waveform thereof unchanged, the output voltage of the power amplifier 118 or 131 is saturated in time periods in which the level of the signal is out of the range from −Vcc/Kd to Vcc/Kd, for example, a period from time t2 to t3.

Figure 3A:
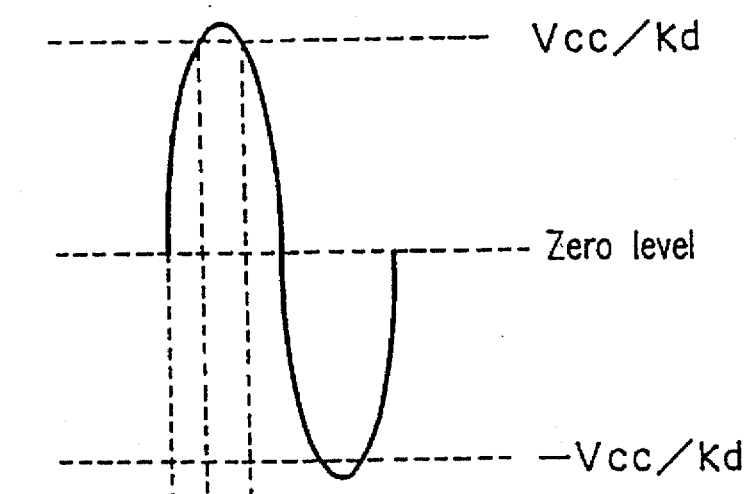
FIGS. 3a–3b show waveforms explaining the operation of the control amount correction circuit according to the first example of the present invention.
Figure 3B:
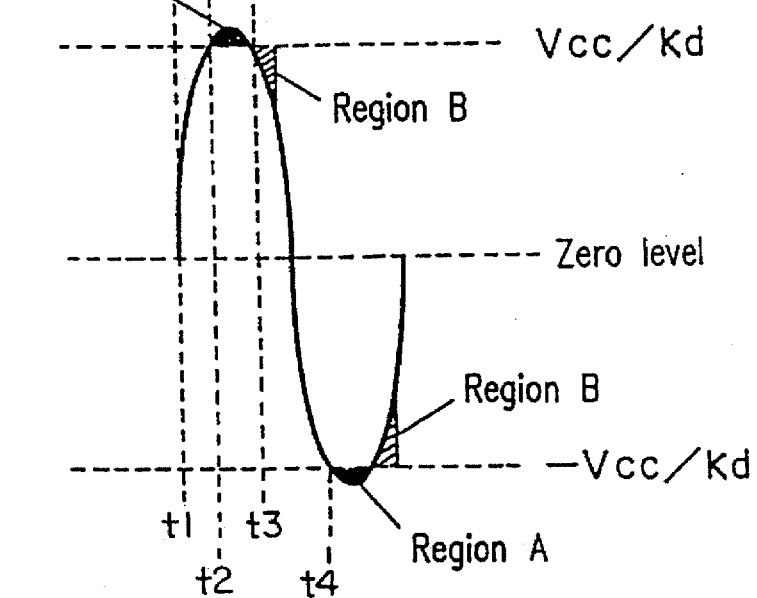

In a time period from time t1 to t2, the level of the signal input to the terminal 200 is within the range of −Vcc/Kd to +Vcc/Kd as shown in FIG. 3. Therefore, the levels of input voltage Vi and output voltage Vo of the limiting circuit 203 are equal to each other. As a result, an output of the subtracter 204 is zero, and an output of the delay circuit 205 is also zero.

On the other hand, during a time period from time t2 to t3, since Vi exceeds Vcc/Kd, an output value of the subtracter 204 is not zero. This output from the subtracter 204 is delayed in the delay circuit 205, and then is added to an input signal of the terminal 200. In other words, when Vi exceeds Vcc/Kd, a difference between Vi and Vcc/Kd is integrated by the adder 202 and the delay circuit 205. The integrated voltage value is output from the terminal 201 during a time period from t3 to t4 during which the input voltage of the terminal 200 is Vcc/Kd or lower. More specifically, in the waveform (b) of FIG. 3, an area of a region A corresponds to the amount of saturation in the time period from time t2 to t3, and is equal to an area of a region B corresponding to a voltage value. This voltage value is added to the signal by the adder 202 after time t3. As described above, in the case where a voltage input to the terminal 200 exceeds Vcc/Kd, an output voltage of the power amplifier 118 or 131 is saturated. However, since a saturated voltage is output in a time period from time t3 to t4, the influence of saturation is reduced.

Figure 4:
FIG. 4 is a waveform showing an output voltage of a power amplifier according to the first example of the present invention.
Figure 16:
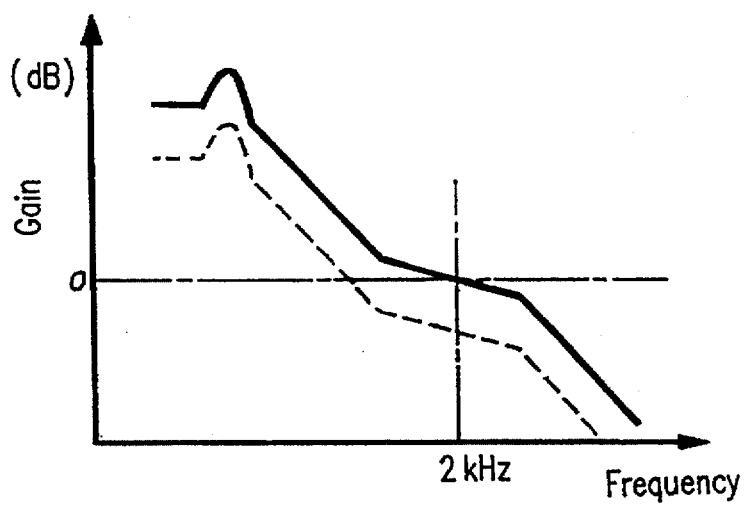
FIG. 16 is a graph showing frequency characteristics of the conventional focusing control device.
Figure 17:
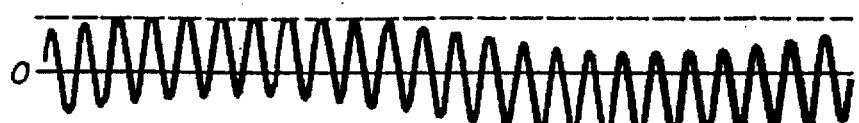
FIG. 17 is a waveform of an output voltage of a power amplifier of the conventional focusing control device.
Figure 18:
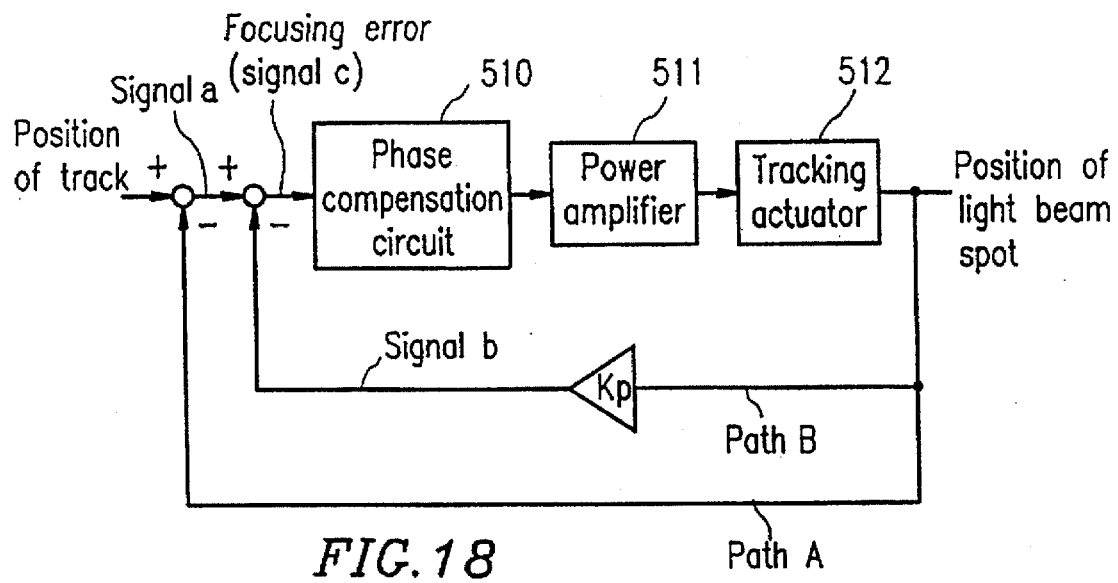
FIG. 18 is a block diagram showing a conventional tracking control device.

An output voltage of the power amplifier 118 according to Example 1 of the present invention is shown in FIG. 4 by a solid line. A dashed line represents an output voltage of the power amplifier of the conventional control device. A difference between the dashed line and the solid line is the corrected amount of saturation. Thus, the influence of saturation is reduced. As a result, characteristics of the focusing control device shown in FIG. 16 is almost identical with those in the case where no saturation occurs. Therefore, a gain is not lowered, and focusing control is not rendered unstable.

The same result is obtained with respect to the tracking control device. In the case of tracking control, although a gain shown in FIG. 21A is not prevented from being lowered, delay of phase indicated with a dashed line in FIG. 21B is prevented. Accordingly, the oscillation conditions are not satisfied. Thus, the tracking control device never oscillates.

As described above, when the output voltage of power amplifier of each of the focusing control device and the tracking control device, which is used as a driving signal to be supplied to the actuator, is saturated, the control amount correction circuit works to reduce the influence of the saturation. More specifically, the control amount correction circuit obtains the amount of the saturation and delays it. Then, the control amount correction circuit outputs a signal obtained by delaying a signal corresponding to the amount of the saturation to the power amplifier, together with the output of the phase compensation circuit. As a result, the influence of the saturation on the voltage for driving the actuator is reduced.

EXAMPLE 2

Figure 5:
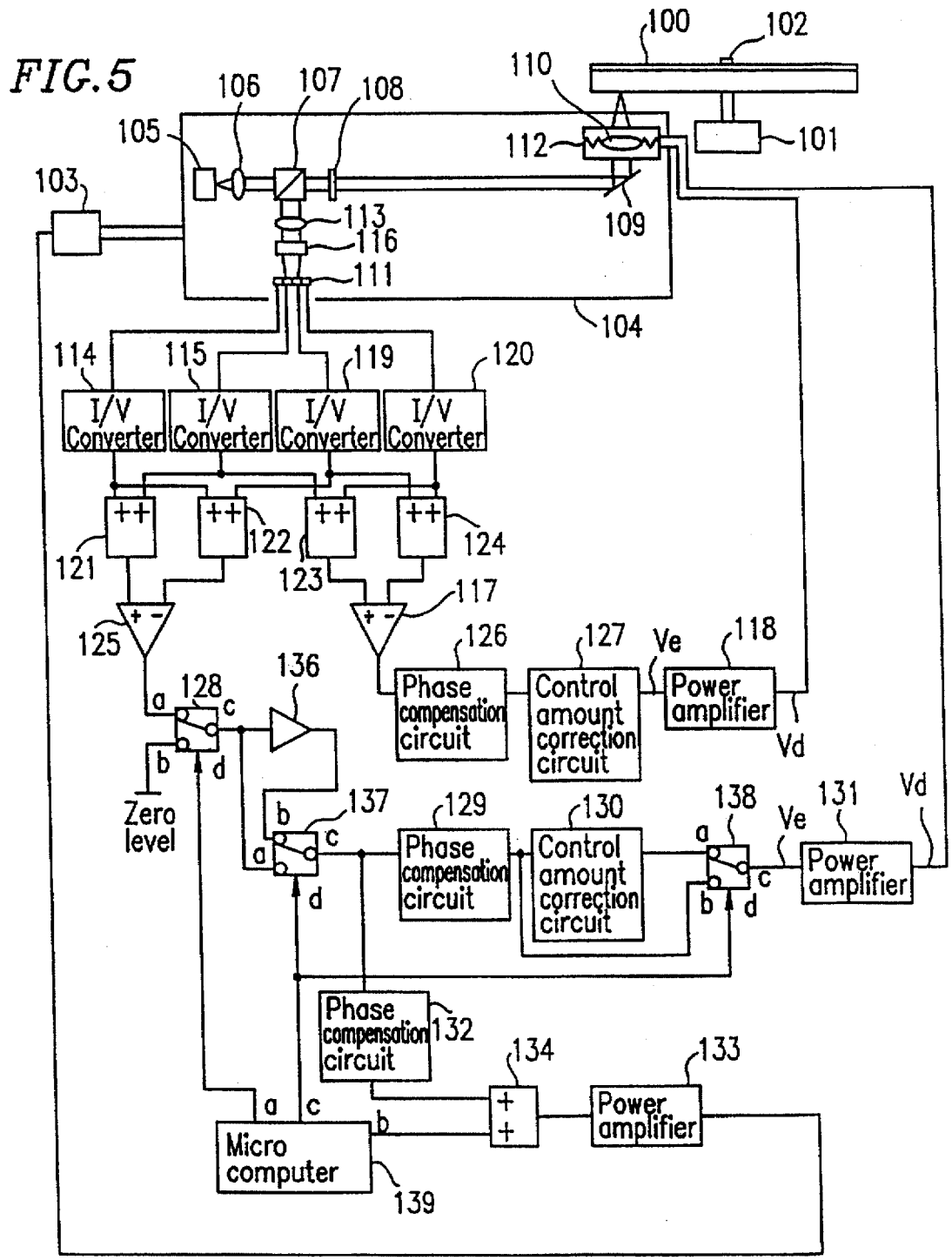
FIG. 5 is a block diagram showing a tracking control device according to a second example of the present invention.

Example 2 of the present invention will be described with reference to FIG. 5. FIG. 5 is a block diagram of an optical disk apparatus according to Example 2. Like reference numerals refer to like components in FIG. 5 so as to omit the description thereof.

The optical disk apparatus of Example 2 is used for an optical disk where information is recorded on concave portions or an optical disk where information is recorded both on convex and concave portions. Therefore, the focusing control device of Example 2 is the same as that of Example 1, but the tracking control device of Example 2 differs from that of Example 1 in that the tracking control device includes an inversion amplifier 136, switches 137 and 138 and a micro computer 139. These components 136 through 139 are added for tracking control in which the beam spot is controlled to be positioned on the concave positions.

The inversion amplifier 136 multiplies an input signal by −1, and outputs it. In each of the switches 137 and 138, a terminal a and a terminal c are connected to each other while a terminal d is held at a high level. The micro computer 139 has such a configuration that a terminal for outputting an output c is added to the micro computer 135 according to Example 1. The output c is supplied to the terminal d of each of the switches 137 and 138. The output c of the micro computer 139 is at a low level, i.e., the terminals d of the switches 137 and 138 are at a low level, in the case where the beam spot is controlled to be positioned on the concave portion. When the output c of the micro computer 139 is at a high level, the beam spot is controlled to be positioned on the convex portion in the same manner as described in Example 1.

Next, the operation of the tracking control device in the case where the light beam tracks the concave portions is described.

Figure 19:
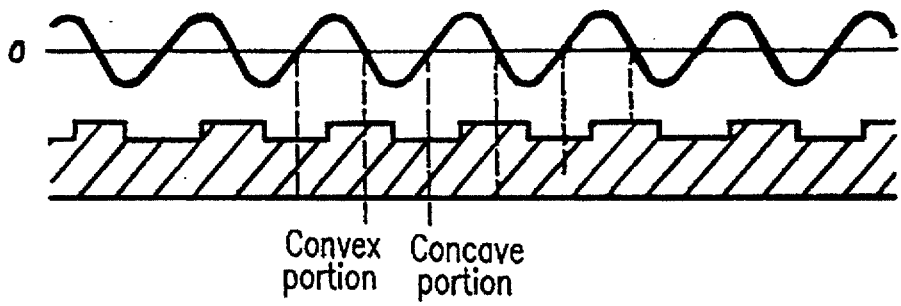
FIG. 19 is a waveform of a tracking error signal obtained in the conventional tracking control device.
Figure 20:
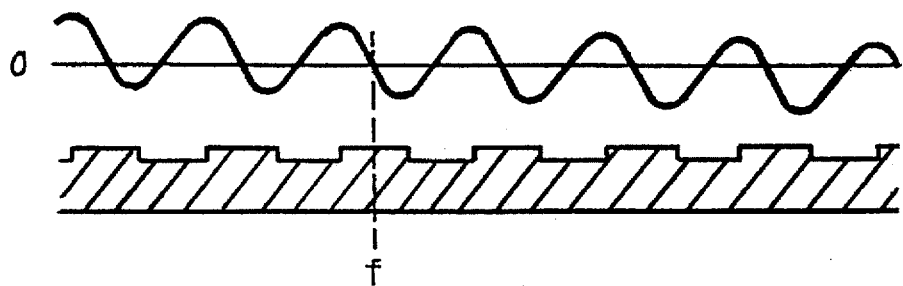
FIG. 20 is a waveform of a tracking error signal obtained in the conventional tracking control device.
Figure 22C:
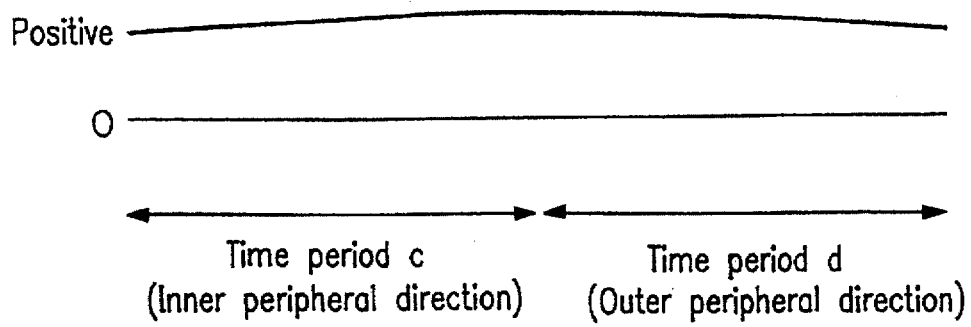
Figure 23:
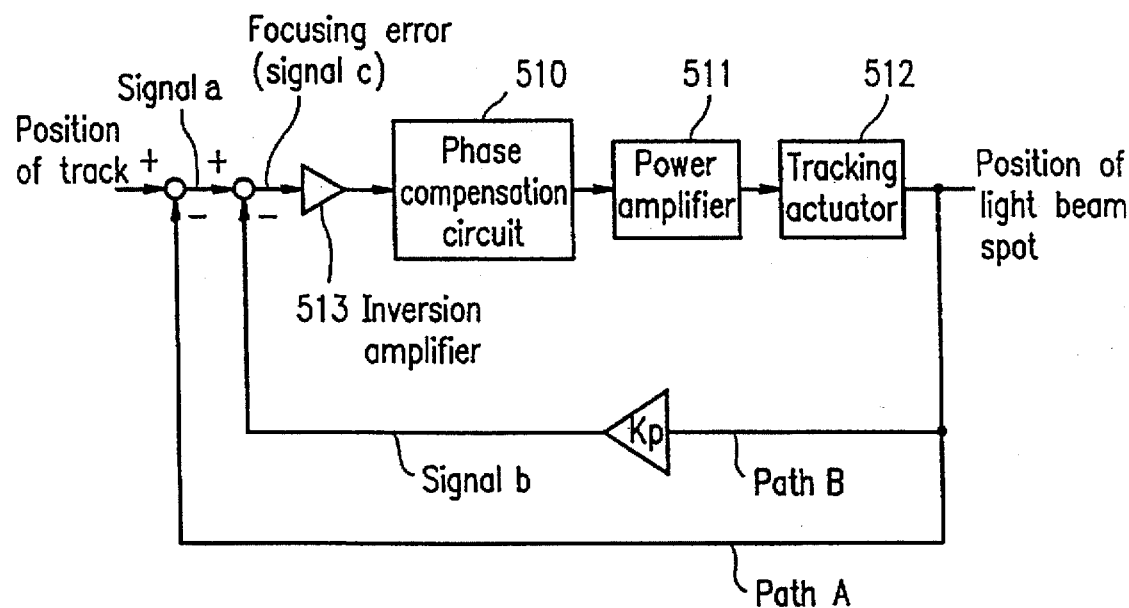
FIG. 23 is a block diagram of another conventional tracking control device.

The tracking error signal, which is an output of the differential amplifier 125, has a waveform shown in FIG. 19. The inclination of the tracking error signal is reversed in the convex and concave portions. Therefore, in the case where the light beam tracks the concave portions, a signal which is obtained by inverting the output signal of the differential amplifier 125 in the inversion amplifier 136 is used for tracking control. More specifically, the level of the output c of the micro computer 139 is rendered low, so that the terminals b and c are connected to each other in each of the switches 137 and 138. Therefore, the inverted signal from the inversion amplifier 136 is input to the phase compensation circuits 129 and 132, respectively. The output of the phase compensation circuit 129 is transmitted to the power amplifier 131 without inputting the control amount correction circuit 130, since the terminal c connected to the power amplifier 131 is connected to the terminal b in the switch 138. That is, the control amount correction circuit 130 is disconnected from the tracking control device. This is because the tracking control device never oscillates in the case where the light beam tracks the concave portions even when saturation occurs in the power amplifier 131. In addition, the operation of the control amount correction circuit 130 can be stopped to reduce power consumption of the device or the like.

As described above, according to Example 2, the tracking control device which never oscillates and therefore is not rendered stable, can be obtained.

EXAMPLE 3

Figure 6:
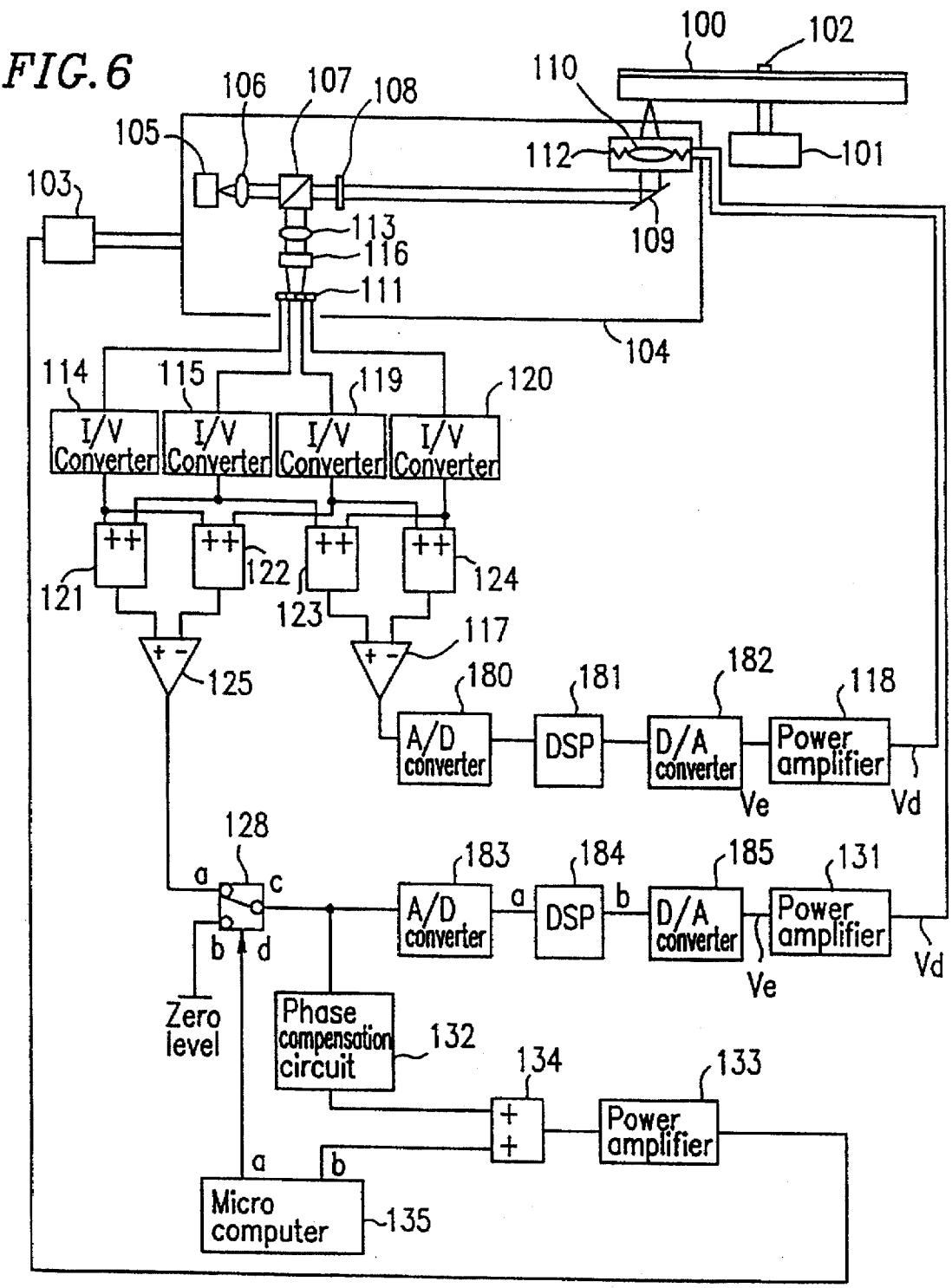
FIG. 6 is a block diagram showing a focusing control device and a tracking control device according to a third example of the present invention.

Example 3 of the present invention will be described with reference to FIG. 6. FIG. 6 is a block diagram of an optical disk apparatus including a tracking control device and focusing control device according to Example 3. Like reference numerals refer to like components in FIG. 6 so as to omit the description thereof.

Example 3 differs from Example 1 in that the phase compensation circuits 126 and 129 and the control amount correction circuits 127 and 130 of the focusing control device and the tracking control device are replaced by analog to digital converters (hereinafter, referred to simply as A/D converters) 180 and 183, digital signal processors (hereinafter, referred to simply as DSPs) 181 and 184, and digital to analog converters (hereinafter, referred to simply as D/A converters) 182 and 185.

Figure 7:
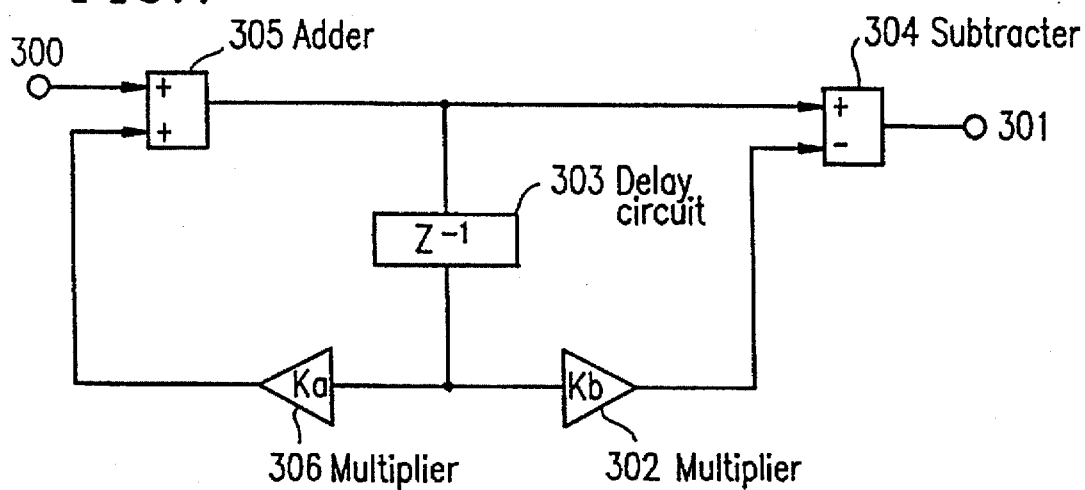
FIG. 7 is a block diagram of a phase compensation circuit according to the third example of the present invention.

In Example 3, a digital signal processing using the DSPs 181 and 184 substitutes for the function of the phase compensation circuits 126 and 129 and the control amount correction circuits 127 and 130. FIG. 7 shows an example of a phase compensation circuit realized by the digital signal processing. A terminal 300 is an input terminal, and a terminal 301 is an output terminal. The digital signal processing is performed in synchronization with a predetermined clock. A delay circuit $Z^{-1}$ 303 outputs a signal of one clock before. Multipliers 306 and 302 multiply input values by Ka and Kb, and output the multiplied values, respectively. An adder 305 adds values input from the terminal 300 and the multipliers 306, and outputs the result of the addition. A subtracter 304 subtracts a value from the multiplier 302 from the result of the addition in the adder 305, and outputs the result of the subtraction. By approximately setting Ka and Kb, it is possible to realize transfer characteristics shown in FIG. 21.

Figure 8:
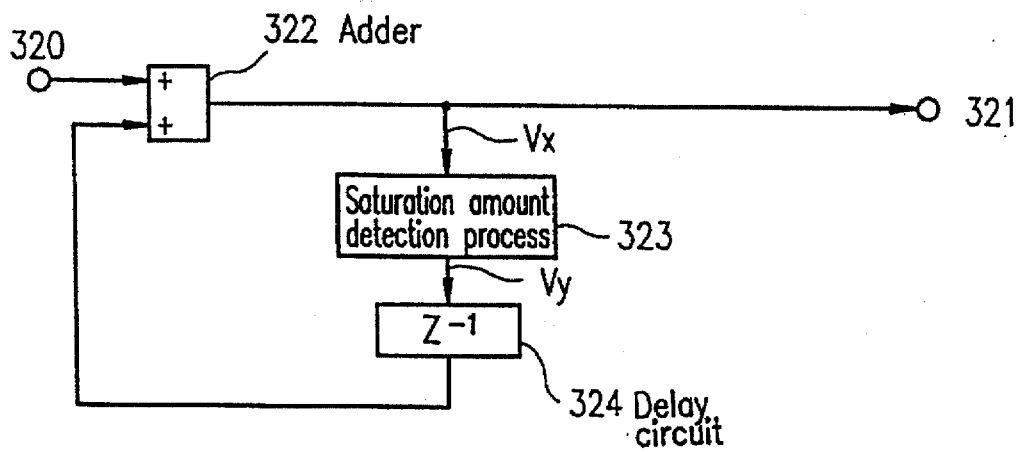
FIG. 8 is a block diagram of a control amount correction circuit according to the third example of the present invention.
Figure 9:
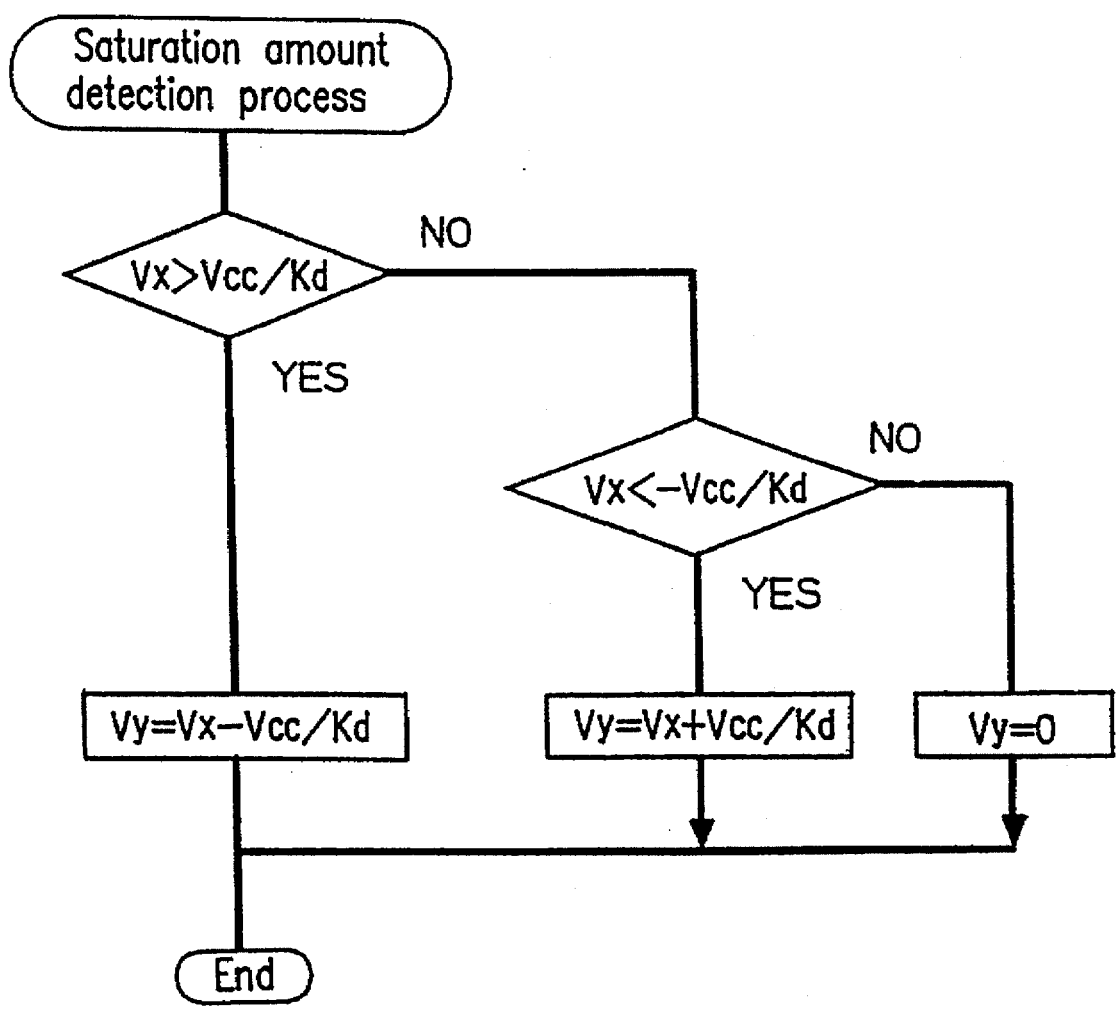
FIG. 9 is a flow chart showing a saturation amount detection process according to the third example of the present invention.

The control amount correction circuit is also realized by the digital signal processing using the DSPs 181 and 184. FIGS. 8 and 9 show an example of the control amount correction circuit realized by the digital signal processing. A terminal 320 is an input terminal, and a terminal 321 is an output terminal. An output of the adder 322 is supplied to a circuit 323 which performs a saturation amount detection processing, and is then input to a delay circuit 324. The saturation amount detection processing which is performed in the circuit 323 are shown in FIG. 9. As is apparent from FIG. 9, the circuit 323 has the same function as that of the control amount correction circuits 127 and 130 according to Example 1. A delaying processing is performed using a delay circuit 324. In the digital signal processing, delay can be easily realized by using a signal of one clock before. Accordingly, the function of the control amount correction circuits 127 and 130 according to Example 1 can be easily realized.

In Example 3, the signal input to the DSPs 181 and 184 are delayed by a time period corresponding to a period of the clock. However, the amount of the delay is not limited to this. The same effect can be obtained as long as the amount of the delay of the signal input to the DSPs 181 and 184 is equal to a time period having a length obtained by multiplying a period of the clock by an integer greater than 1.

In Example 3, although combination of the D/A converters 182 and 185 and the power amplifiers 118 and 131 are used, the same effect can be obtained even when a driving method generally referred to as a PWM (Pulse Width Modulation) method substitutes the function of the D/A converters 182 and 185 and the power amplifiers 118 and 131.

EXAMPLE 4

Figure 10:
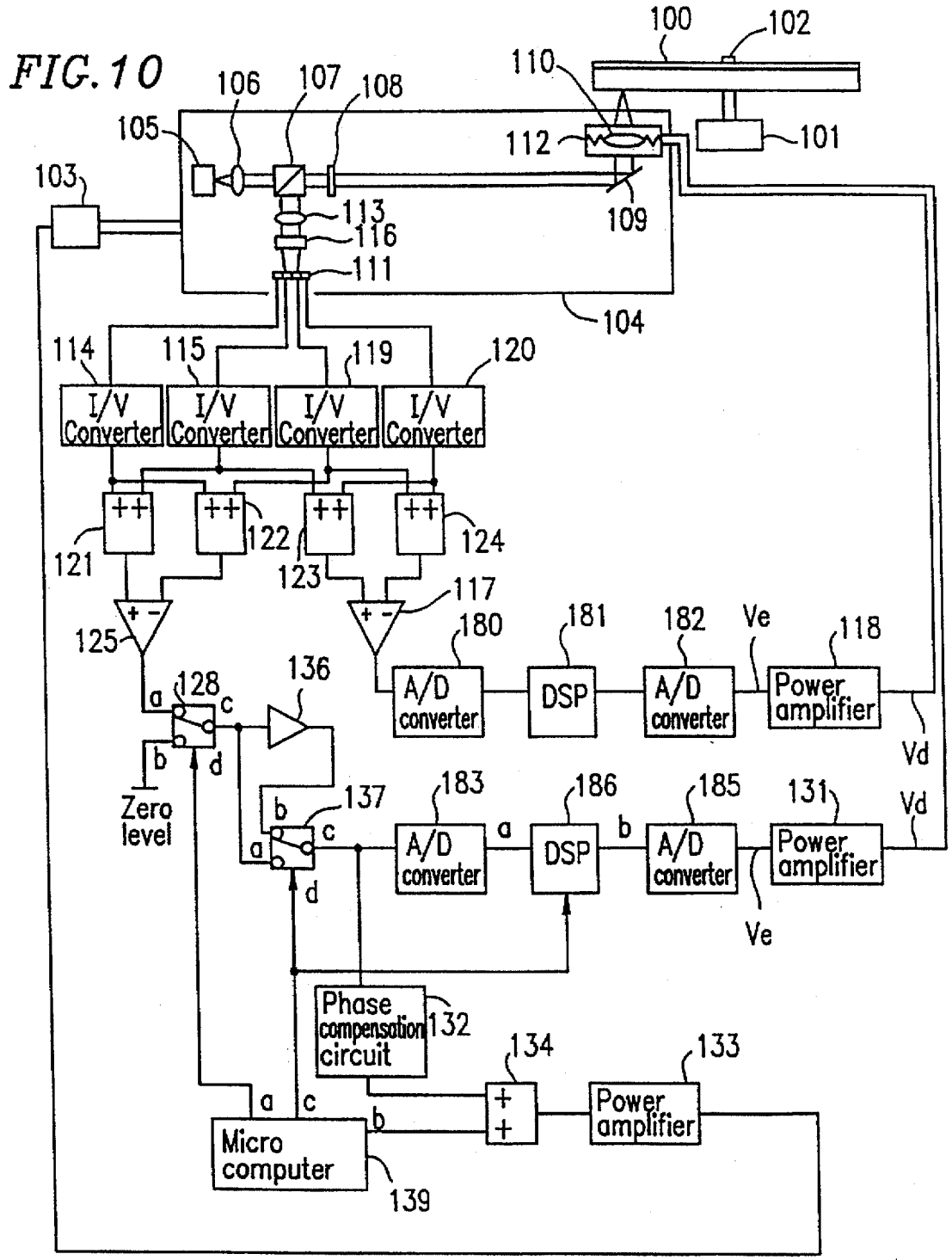
FIG. 10 is a block diagram showing a tracking control device according to a fourth example of the present invention.

Example 4 of the present invention will be described with reference to FIG. 10. FIG. 10 is a block diagram of an optical disk apparatus including a tracking device and a focusing control device according to Example 4. Like reference numerals refer to like components in FIG. 10 so as to omit the description thereof.

In Example 4, the tracking control device is used for an optical disk where information is recorded on concave portions and an optical disk where information is recorded on both convex and concave portions as in Example 2. Example 4 differs from Example 3 in that the tracking control device according to Example 4 has the inversion amplifier 136, the switch 137, a DSP 186 and a micro computer 139. The inversion amplifier 136 multiplies an input signal by −1, and outputs it. In the switch 137, the terminal a and the terminal c are connected to each other while the terminal d is held at a high level. The DSP 186 has such a configuration that the DSP 184 according to Example 3 further includes a terminal c. The micro computer 139 has such a configuration that the micro computer 135 according to Example 3 further includes a terminal connected to the terminal c of the DSP 186. The level of the output from this terminal of the micro computer 139 is rendered high in the case where the light beam tracks the convex portions. When the output signal from the terminal c of the micro computer 139 is at a high level, the DSP 186 operates in the same manner as that in Example 3. Therefore, as described in Example 3, the light beam tracks the convex portions.

In the case where the beam spot is controlled to be positioned on the concave portions, the level of output from the terminal c of the micro computer 139 is rendered low. Therefore, in the switch 137, the terminal b connected to the inversion amplifier 136 is connected to the terminal c, so that the signal obtained by inverting the output signals of the differential amplifier 125 in the inversion amplifier 136 are input to the A/D converter 183 and the phase compensation circuit 132. In this way, the light beam tracks the concave portions as described in Example 2.

On the other hand, when a signal at a low level is input to the terminal c of the DSP 186 from the micro computer 139, the DSP 186 stops the operation of the digital signal processing corresponding to the function of the control amount correction circuit shown in FIG. 8 according to Example 3. Specifically, a signal, which is input to the terminal 320 in FIG. 8, is directly transmitted to the terminal 321. This is because, as described in Example 2, the tracking control never oscillates in the case where the light beam tracks the concave portions even when saturation occurs in the power amplifier 131. In addition, a processing time can be shortened by stopping the operation of the digital signal processing corresponding to the function of the control amount correction circuit.

EXAMPLE 5

Example 5 will be described with reference to FIG. 11. An optical disk apparatus of Example 5 differs from that of Example 1 in that the control amount correction circuits 127 and 130 are replaced by control amount correction circuits 600 and 601 (not shown), respectively. The control amount correction circuits 600 and 601 have the same configuration. Since the components except the control amount correction circuit 600 and 601 are the same as those in Example 1, only the control amount correction circuits 600 and 601 are described in Example 5 and the description of the other components of the optical disk apparatus is herein omitted.

Figure 11:
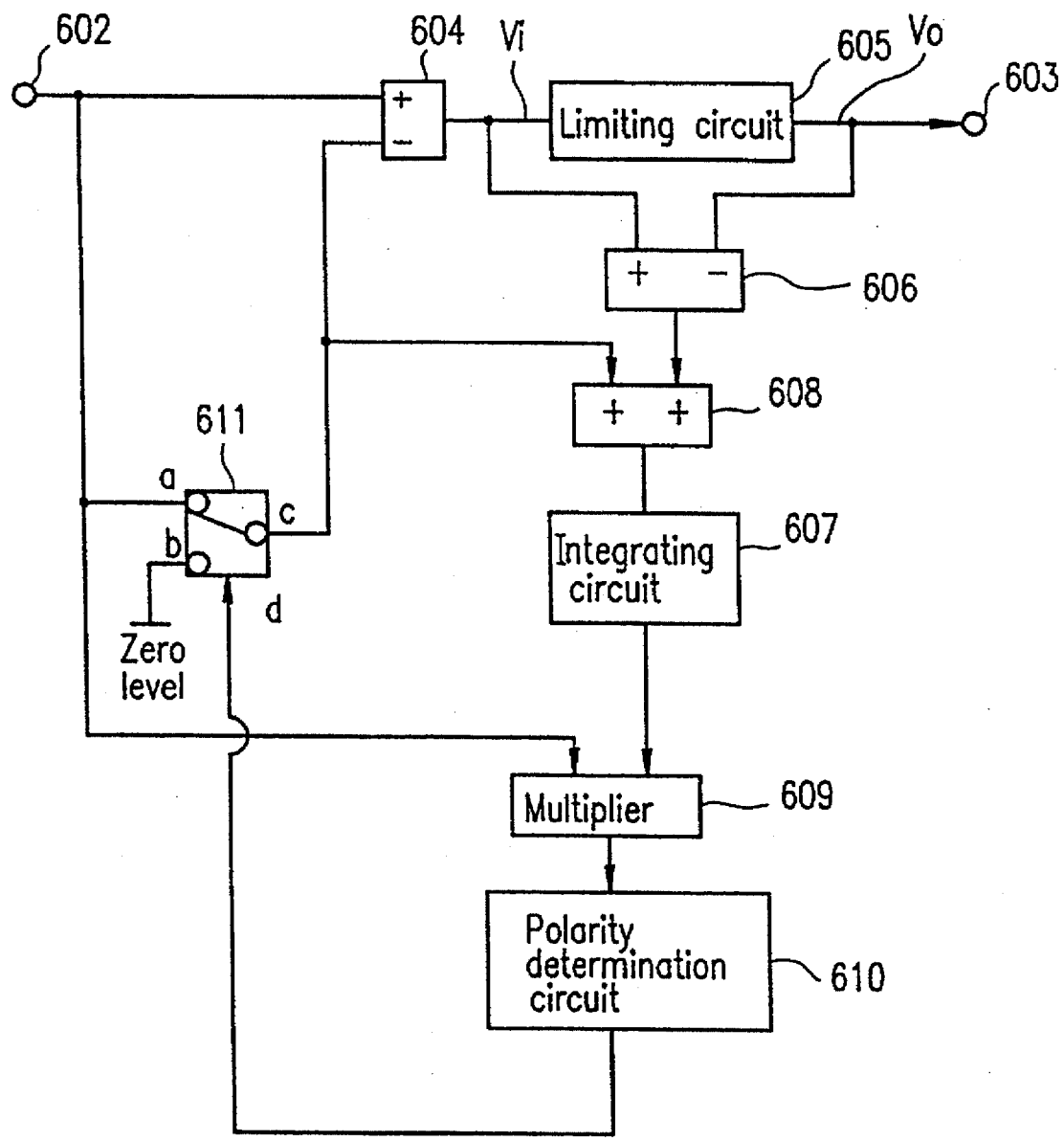
FIG. 11 is a block diagram showing a control amount correction circuit according to a fifth example of the present invention.

FIG. 11 is a block diagram showing the control amount correction circuits 600 and 601. A terminal 602 is an input terminal, and a terminal 603 is an output terminal. A limiting circuit 604 is identical with the limiting circuit 203 used in Example 1. Therefore, in the case where an input voltage Vi is within the range from −Vcc/Kd to Vcc/Kd, the limiting circuit 605 outputs Vi, that is, the output voltage Vo of the limiting circuit 605 is equal to Vi. In the case where the input voltage Vi is greater than Vcc/Kd, Vo=Vcc/Kd. In the case where the input voltage Vi is smaller than −Vcc/Kd, Vo=−Vcc/Kd.

Subtracters 604 and 606 output differences in input voltages, respectively. An adder 608 adds the input voltages, and outputs the result. A multiplier 609 multiplies an input signal, and outputs the result. A polarity determination circuit 610 outputs a signal at a low level in the case where the input signal is positive or zero, and outputs a signal at a high level in the case where the input signal is negative. Then a switch 611 connects terminals a and c to each other when the signal input to a terminal d is at a high level, and connects terminals b and c to each other when the signal input to the terminal d is at a low level.

The operation of the control amount correction circuits 600 and 601 will be described with reference to waveforms (a) through (c) shown in FIG. 12. It is assumed that a signal having a waveform (a) is input to the terminal 602. A waveform (b) represents an output of the polarity determination circuit 610, and a waveform (c) represents an output from the terminal 603.

Figure 12:
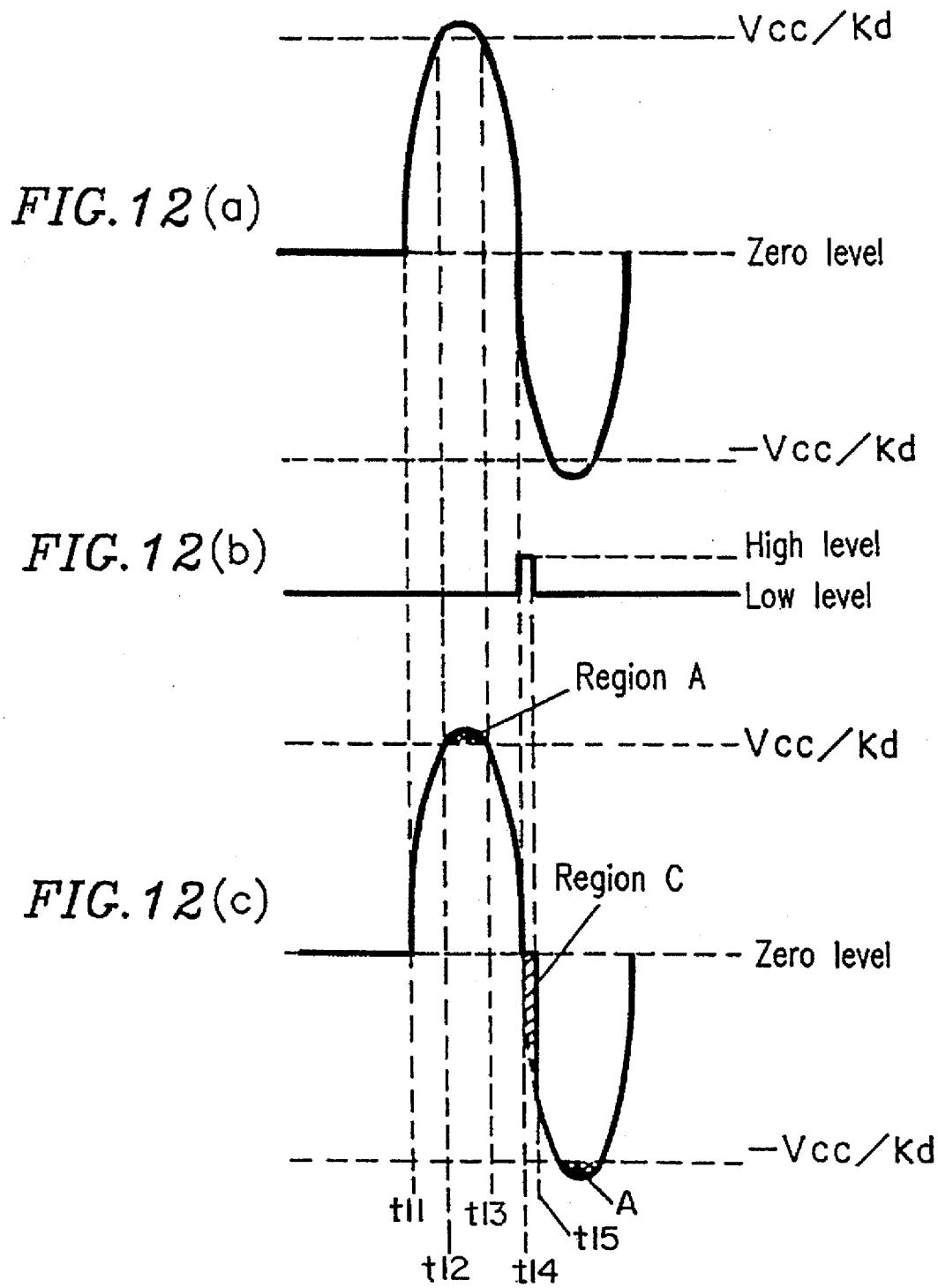
FIGS. 12a–12c show waveforms explaining the operation of the control amount correction circuit according to the fifth example of the present invention.
Figure 13:
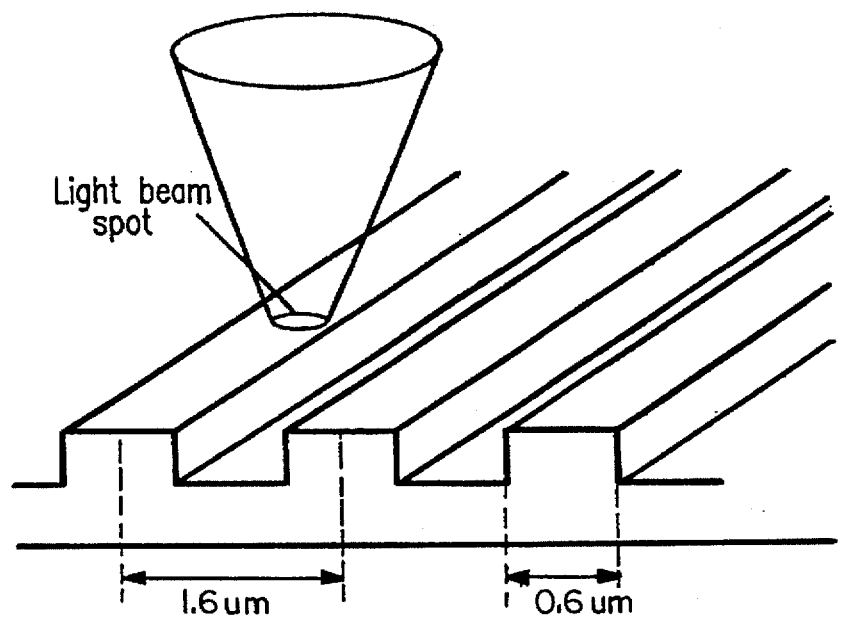
FIG. 13 is an enlarged schematic view of an optical disk.
Figure 14:
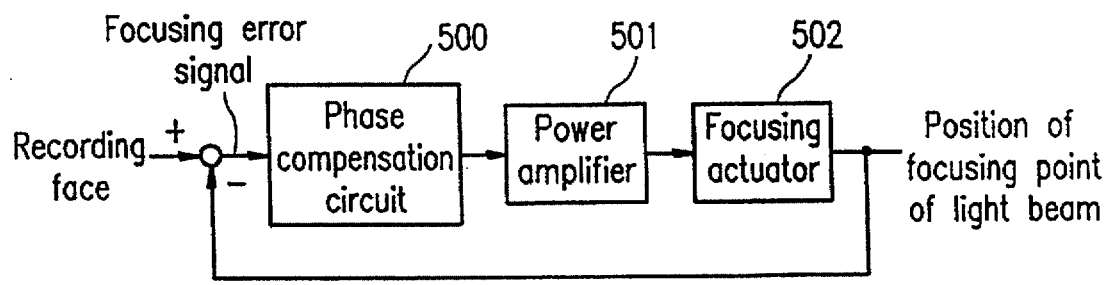
FIG. 14 is a block diagram showing a conventional focusing control device.
Figure 15A:
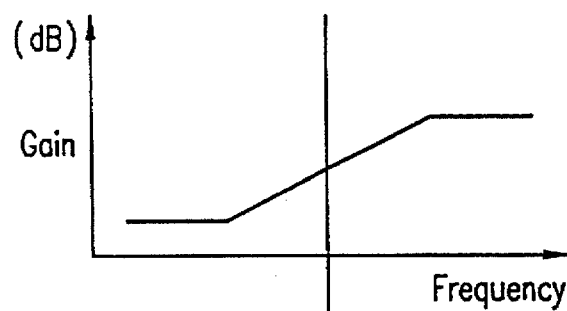
FIGS. 15A and 15B are graphs showing frequency characteristics of a phase compensation circuit in the conventional focusing control device.
Figure 15B:
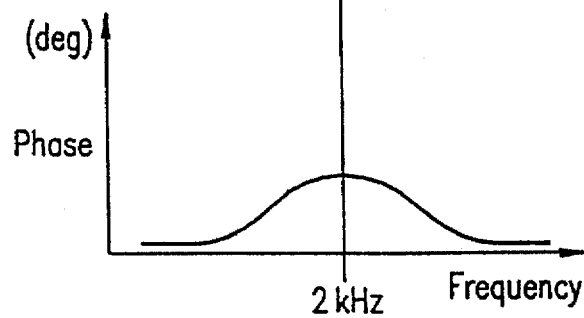

As shown in FIG. 12, the waveform (a) is zero before time t11. Therefore, an output of the multiplier 609 is zero and the polarity determination circuit 610 outputs a signal at a low level (waveform (b)). Thus, the terminal b and c of the switch 611 are connected to each other. Also, the output of the switch 611 is zero. Therefore, the output of the subtracter 604 is to be input to the terminal 602.

At time t12, the level of the input signal having the waveform (a) exceeds Vcc/Kd. Thus, the output of the limiting circuit 605 is Vcc/Kd. The output of the subtracter 606 corresponds to hatched regions A in the waveform (c). The output of an integrating circuit 607 has a value corresponding to the area of the region A. Immediately after time t14, the output value of the integrating circuit 607 is positive and the input signal (waveform (a)) is negative. Therefore, the output of the polarity determining circuit 610 is at a high level. The terminals a and c of the switch 611 are connected to each other, so that the input signal of the terminal 602 is transmitted to the subtracter 604 and the adder 608. Therefore, an amplitude of the signal output from the terminal 603 is reduced as represented by a region C in the waveform C. Specifically, in order to reduce the influence of the amount of saturation (regions A) at the positive polarity, a voltage value, which is otherwise to be output in a negative time period from time t14 to t15, is lowered. The output value of the integrating circuit 607 becomes zero at time t15. In other words, an area of the regions A and an area of the region C are equal to each other.

Since a voltage value, which is otherwise output, is lowered, a current flowing through the coil of the actuator can be reduced so as to reduce power consumption as compared with Example 1. The tracking control device can be configured using a digital signal processing by means of DSP as in Examples 3 and 4. In such a case, the circuit is advantageously simplified.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tracking control device for controlling a position of a beam spot formed by converging a light beam on a disk having tracks formed thereon, the tracks including at least convex tracks, the device comprising:

moving means for moving the beam spot in a direction substantially perpendicular to the track;

tracking error detecting means for detecting a deviation of the beam spot from one of the tracks using the light beam returning from the disk and for outputting a tracking error signal indicative of the detected deviation; and control means for outputting a driving signal to drive the moving means in accordance with the tracking error signal so as to control the beam spot to be positioned on the one of the tracks, wherein the control means, when the driving signal is saturated, obtains a saturation signal in accordance with an amount of the saturation, delays the saturation signal and supplies the saturation signal to the moving means together with the driving signal.

2. A tracking control device according to claim 1, wherein the tracks further include concave tracks, and wherein the control means supplies the saturation signal to the moving means when the beam spot is controlled to be positioned on one of the convex tracks, whereas the control means supplies the driving signal without supplying the saturation signal when the beam spot is controlled to be positioned on one of the concave tracks.

3. A tracking control device according to claim 1, wherein the control means includes: analog-to-digital converting means for digitalizing the tracking error signal; and digital signal processing means for processing the digitalized tracking error signal and for outputting the driving signal in accordance with the result of the processing, and wherein the digital signal processing means obtains the saturation signal and supplies the delayed saturation signal to the moving means together with the driving signal.

4. A tracking control device according to claim 3, wherein the digital signal processing means receives a reference clock and delays the saturation signal by a time period having a length obtained by multiplying a period of the reference clock by an integer equal to or greater than 1.

5. A tracking control device for controlling a position of a beam spot formed by converging a light beam on a disk having tracks formed thereon, the tracks including at least convex tracks, the device comprising:

moving means for moving the beam spot in a direction substantially perpendicular to the track;

tracking error detecting means for detecting a deviation of the beam spot from one of the tracks using the light beam returning from the disk, and for outputting a tracking error signal indicative of the detected deviation; and control means for outputting a driving signal to drive the moving means in accordance with the tracking error signal so as to control the beam spot to be positioned on the one of the tracks, wherein the control means, when the driving signal is saturated, integrates the amount of the saturation, and supplies the integrated amount of the saturation to the moving means when a polarity of the driving signal is inverted, so as to reduce the driving signal by the integrated amount of the saturation.

6. A tracking control device according to claim 5, wherein the tracks further include concave tracks, and wherein the control means reduces the driving signal by supplying the integrated amount of the saturation when the beam spot is controlled to be positioned to one of the convex tracks, whereas the control means supplies the driving signal without reducing the driving signal when the beam spot is controlled to be positioned to one of the concave tracks.

7. A tracking control device according to claim 5, wherein the control means includes: analog-to-digital converting means for digitalizing the tracking error signal; and digital signal processing means for processing the digitalized tracking error signal and for outputting the driving signal in accordance with the result of the processing, and wherein the digital signal processing means integrates the amount of the saturation when the driving signal is saturated, and supplies the integrated amount of the saturation to the moving means so as to reduce the driving signal by the integrated amount of the saturation.

8. A focusing control device for controlling a point at which a light beam is focused to be positioned on a disk, comprising:

moving means for moving the point in a direction substantially perpendicular to the disk;

focusing error detecting means for detecting a shift of the point from the disk using the light beam returning from the disk and for outputting a focusing error signal indicative of the detected shift; and control means for outputting a driving signal to drive the moving means in accordance with the focusing error signal so as to control the point to be positioned on the disk, wherein the control means, when the driving signal is saturated, obtains a saturation signal indicative of an amount of the saturation, delays the saturation signal and supplies the saturation signal to the moving means together with the driving signal.

9. A focusing control device according to claim 8, wherein control means includes: analog-to-digital converting means for digitalizing the focusing error signal; and the digital signal processing means for processing the digitalized focusing error signal and for outputting the driving signal in accordance with the result of processing, and wherein the digital signal processing means obtains the saturation signal and supplied the delayed saturation signal to the moving means together with the driving signal.

10. A focusing control device according to claim 9, wherein the digital signal processing means receives a reference clock and delays the saturation signal by a time period having a length obtained by multiplying a period of the reference clock by an integer equal to or greater than 1.

11. A focusing control device for controlling a point at which a light beam is focused to be positioned on a disk, comprising:

moving means for moving the point in a direction substantially perpendicular to the disk;

focusing error detecting means for detecting a shift of the point from the disk using the light beam returning from the disk, and for outputting a focusing error signal indicative of the detected shift; and control means for outputting a driving signal to drive the moving means in accordance with the focusing error signal so as to control the point to be positioned on the disk, wherein the control means, when the driving signal is saturated, integrates the amount of the saturation, and supplies the integrated amount of the saturation to the moving means when a polarity of the driving signal is inverted, so as to reduce the driving signal by the integrated amount of the saturation.

12. A focusing control device according to claim 11, wherein control means includes: analog-to-digital converting means for digitalizing the focusing error signal; and the digital signal processing means for processing the digitalized focusing error signal and for outputting the driving signal in accordance with the result of processing, and wherein the digital signal processing means integrates the amount of the saturation when the driving signal is saturated, and supplies the integrated amount of the saturation to the moving means so as to reduce the driving signal by the integrated amount of the saturation.

13. An optical disk apparatus for recording information on an optical disk having tracks and/or for reproducing information from the optical disk, the apparatus comprising:

means for emitting a light beam and for converging the light beam into a beam spot on a track to record and/or reproduce information on and/or from the optical disk;

moving means for moving the beam spot in a direction substantially perpendicular to the tracks;

tracking error detecting means for detecting a deviation of the beam spot from one of the tracks using the light beam returning from the disk and for outputting a tracking error signal indicative of the detected deviation; and control means for outputting a driving signal to drive the moving means in accordance with the tracking error signal so as to control the beam spot to be positioned on the one of the tracks, wherein the control means, when the driving signal is saturated, obtains a saturation signal in accordance with an amount of the saturation, delays the saturation signal and supplies the saturation signal to the moving means together with the driving signal.

14. An optical disk apparatus according to claim 13, further comprising focusing error detecting means for detecting a shift of a point at which the light beam is focused from the disk using the light beam returning from the disk and for outputting a focusing error signal indicative of the detected shift, wherein the moving means for moving the point in a focusing direction substantially perpendicular to the disk, and the control means outputs a further driving signal for driving the moving means to move the point at which the light beam is focused in the focusing direction in accordance with the focusing error signal, and wherein, when the further driving signal is saturated, the control means obtains a further saturation signal indicative of an amount of the saturation of the further driving signal, delays the further saturation signal and supplies the further saturation signal to the moving means together with the further driving signal.

* * * * *